(12) United States Patent
Kim

(10) Patent No.: US 9,708,016 B2
(45) Date of Patent: Jul. 18, 2017

(54) HEIGHT ADJUSTMENT DEVICE FOR ROOF SPOILER

(71) Applicant: Hyundai Motor Company, Seoul (KR)

(72) Inventor: Young Shin Kim, Gyeongi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/204,947

(22) Filed: Jul. 7, 2016

(65) Prior Publication Data

US 2017/0120964 A1  May 4, 2017

(30) Foreign Application Priority Data

Oct. 28, 2015  (KR) .................. 10-2015-0150093

(51) Int. Cl.
*B62D 35/00* (2006.01)

(52) U.S. Cl.
CPC .................. *B62D 35/001* (2013.01)

(58) Field of Classification Search
CPC .... B62D 35/00; B62D 35/001; B62D 35/005; B62D 35/007
USPC ................ 296/180.1, 180.2, 180.5
See application file for complete search history.

(56) References Cited

U.S. PATENT DOCUMENTS

| | | | | |
|---|---|---|---|---|
| 3,794,372 A | * | 2/1974 | Webb .................. | B62D 35/002 296/180.3 |
| 4,102,548 A | * | 7/1978 | Kangas ................ | B62D 35/001 105/1.2 |
| 4,749,220 A | * | 6/1988 | Adams ................. | B62D 35/001 296/180.3 |
| 4,784,424 A | * | 11/1988 | Wiley, Jr. ............. | B62D 35/001 264/152 |
| 4,919,472 A | * | 4/1990 | Wiley, Jr. ............. | B62D 35/001 296/180.2 |
| 5,249,837 A | * | 10/1993 | Luttrell ................ | B62D 35/001 296/180.3 |
| 5,538,316 A | * | 7/1996 | Bartholomew ...... | B62D 35/001 296/180.3 |
| 2005/0189786 A1 | * | 9/2005 | Spence ................ | B62D 35/001 296/180.2 |
| 2005/0281042 A1 | * | 12/2005 | Kawai .................. | B62D 35/001 362/493 |
| 2007/0200390 A1 | * | 8/2007 | Lotarev ................ | B62D 35/001 296/180.2 |
| 2008/0244907 A1 | * | 10/2008 | Boucher .............. | B62D 35/001 29/897.2 |
| 2013/0270856 A1 | * | 10/2013 | Laudet ................. | B62D 35/001 296/180.3 |

(Continued)

FOREIGN PATENT DOCUMENTS

| | | |
|---|---|---|
| JP | 4883685 B2 | 2/2012 |
| KR | 20-1998-0064212 U | 11/1998 |

(Continued)

*Primary Examiner* — Gregory Blankenship
(74) *Attorney, Agent, or Firm* — Mintz Levin Cohn Ferris Glovsky and Popeo, P.C.; Peter F. Corless

(57) ABSTRACT

The present invention relates to a height adjustment device for a roof spoiler which is able to enhance aerodynamic performance of a vehicle. The height of the roof spoiler can be adjusted with an easier operation. Any height difference between a roof of a vehicle body and a container box can be effectively reduced by increasing the height adjustment amount of the roof spoiler, thereby enhancing the aerodynamic performance of the vehicle.

13 Claims, 9 Drawing Sheets

(56) References Cited

U.S. PATENT DOCUMENTS

| | | | | |
|---|---|---|---|---|
| 2014/0084625 A1* | 3/2014 | Ramos | ............... | B62D 35/001 296/180.2 |
| 2014/0265433 A1* | 9/2014 | Fritts | ................ | B62D 35/001 296/180.2 |
| 2015/0274222 A1* | 10/2015 | Wolf | ................ | B62D 35/007 296/180.5 |
| 2015/0360735 A1* | 12/2015 | Butler | ............... | B62D 35/001 296/180.3 |
| 2016/0023693 A1* | 1/2016 | Wolf | ................ | B60L 11/1874 296/180.5 |

FOREIGN PATENT DOCUMENTS

| | | | |
|---|---|---|---|
| KR | 2003-0086134 | A | 11/2003 |
| KR | 2006-0067222 | A | 6/2006 |
| KR | 20-0435239 | Y1 | 1/2007 |
| KR | 2009-0002908 | U | 3/2009 |

* cited by examiner

HEIGHT ADJUSTMENT DEVICE FOR ROOF SPOILER

CROSS-REFERENCE TO RELATED APPLICATION

This application claims under 35 U.S.C. §119(a) the benefit of Korean Patent Application No. 10-2015-0150093 filed on Oct. 28, 2015, the entire contents of which are incorporated herein by reference.

BACKGROUND (a) Technical Field

The present invention relates to a height adjustment device for a roof spoiler, more particularly, to a height adjustment device for a roof spoiler which is able to enhance aerodynamic performance of a vehicle.

(b) Description of the Related Art

In the case of a freight vehicle (e.g., a truck), fuel efficiency may be degraded due to air resistance during driving since a height difference exists between the roof of a vehicle body in which a driver rides and a freight-loaded deck (or a container box). In order to solve the above-mentioned height difference problem, the freight vehicle, in general, is equipped with a roof spoiler on the roof of the vehicle body.

The roof spoiler is provided to improve aerodynamic performance so as to reduce any aerodynamic resistance which may occur due to the height difference between the roof of the vehicle body and the freight-loaded deck. The roof spoiler is configured to compensate a height difference between the roof of the vehicle body and the freight-loaded deck by adjusting a relative height between them.

In the case of a freight vehicle, a user should adjust the height of the roof spoiler, if necessary, since the height of the freight-loaded deck is not always constant.

The above information disclosed in this Background section is only for enhancement of understanding of the background of the invention and therefore it may contain information that does not form the prior art that is already known in this country to a person of ordinary skill in the art.

SUMMARY

An object of the present invention is to provide a height adjustment device for a roof spoiler in which the height of a roof spoiler can be adjusted through an easier operation.

Another object of the present invention is to provide a height adjustment device for a roof spoiler which is able to enhance aerodynamic performance by effectively reducing a height difference between the roof of a vehicle body and a container box by increasing a height adjustment amount of the roof spoiler.

Accordingly, in one aspect, the present invention provides a height adjustment device for a roof spoiler, which may include a roof spoiler which is disposed on a roof panel of a vehicle body by a base panel arranged at both sides; and a height adjustment unit configured to adjust the height of a rear end portion of the roof spoiler, wherein the height adjustment unit may include a height adjustment knob which is assembled to be axially rotatable to a central portion of a rod pipe which is fixedly installed between base panels of both sides; a main rod which operates in cooperation with a rotational operation of the height adjustment knob and is configured to move, in the longitudinal directions, a pair of sliding stays which are connected to both side end portions of the longitudinal directions thereof; and a pair of height adjustment stays of which the both side end portions are rotatably engaged to the sliding stays and roof spoiler respectively, and which supports one side of the rear end portion of the roof spoiler. In particular, as the slopes of the height adjustment stays change based on the linear movement directions and distances of the sliding stays, the height adjustment stays are able to support one side of the rear end portion of the roof spoiler.

According to an embodiment of the present invention, the main rod is installed to be axially rotatable at an inner portion of the rod pipe by a rod holder, and a thread part holder is assembled to both side end portions of the longitudinal direction of the main rod so as to linearly move a pair of the sliding stays in the directions opposite to each other along the longitudinal direction of the main rod in cooperation with the axial rotation of the main rod.

More specifically, the thread part holder is engaged to a thread part formed at both side end portions of the main rod in a linearly movable manner, and is engaged to integrally move with the sliding stays.

Moreover, according to an embodiment of the present invention, a holder cooperation unit is provided between the thread part holder and the height adjustment stay so as to operate the height adjustment stays in response to a rotational operation of the thread part holder.

More specifically, the holder cooperation unit may include a first helical gear which is engaged to be linearly movable while rotating integral with the thread part holder; a second helical gear which is tooth-engagedly rotatable to the first helical gear in the axial line direction which is orthogonal to the axial line direction of the first helical gear; and a joint unit which is engaged to be coaxially rotatable to the second helical gear and is connected cooperative to the height adjustment stay.

Moreover, according to an embodiment of the present invention, the height adjustment stay may include a height adjustment rod which is connected to be integrally rotatable to the second helical gear via the joint unit; a popup rod which is tooth-engaged to the height adjustment rod and linearly moves in the longitudinal direction of the height adjustment rod during the rotation of the height adjustment rod; and a height adjustment pipe having a guide rail to guide the linear movement of the popup rod, and both the end portions of the height adjustment pipe are engaged rotatable to a lower surface portion of the roof spoiler and to the sliding stay.

Moreover, according to an embodiment of the present invention, the main rod may include a non-thread part formed between the thread parts of both side end portions engaged to the thread part holder so as to interrupt the linear movement of the thread part holder.

Furthermore, the roof spoiler may include a main spoiler; and a tilt spoiler which is engaged rotatable to a rear end portion of the main spoiler, and the lower end portion of the tilt spoiler is supported by a lower end engaging shoulder formed at the rear end portion of the main spoiler.

Moreover, the popup rod is disposed below the roof spoiler and ascends while pushing upward the tilt spoiler when protruding upward from the height adjustment pipe.

Furthermore, the height adjustment knob is assembled to be axially rotatable to a central portion of the rod pipe via a pipe connector, and the main rod includes, at a central portion thereof in the longitudinal direction, a gear unit which is tooth-engaged to the height adjustment knob and is able to rotate in the axial line direction which is orthogonal to the axial line direction of the height adjustment knob.

Moreover, a hinge reinforcement, which is engaged to a front end portion of the roof spoiler via a connecting bracket, is installed to be axially rotatable between the base panels of both sides, and a rear end of the roof spoiler is supported rotatable about the hinge reinforcement.

Other aspects and preferred embodiments of the invention are discussed infra.

According to the height adjustment device for a roof spoiler, the height of the roof spoiler can be adjusted such that a single worker can operate a height adjustment knob with one hand. The height of the roof spoiler can be adjusted step by step in such a way to easily operate the height adjustment knob. Therefore, the height of the roof spoiler can be adjusted in response to each of the heights of various container boxes, for which the aerodynamic performance of the roof spoiler can be improved, and fuel savings can be achieved along with enhanced fuel efficiency.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
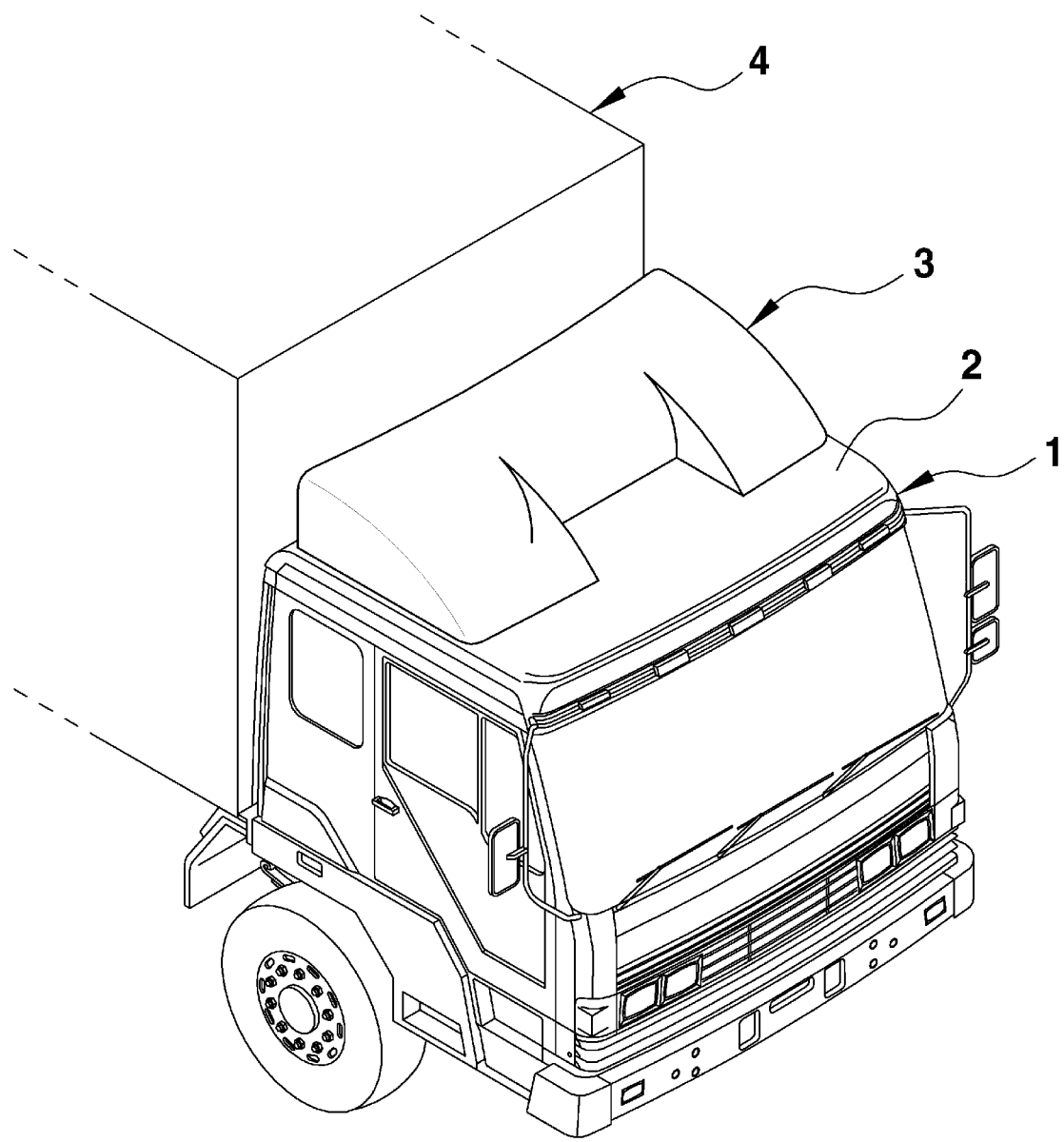
FIG. 1 (RELATED ART) is a perspective view of a roof spoiler which is mounted on a conventional freight vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

For the sake of an easier understanding of the present invention, the height adjustment device for a conventional roof spoiler will be first described in brief.

Figure 2:
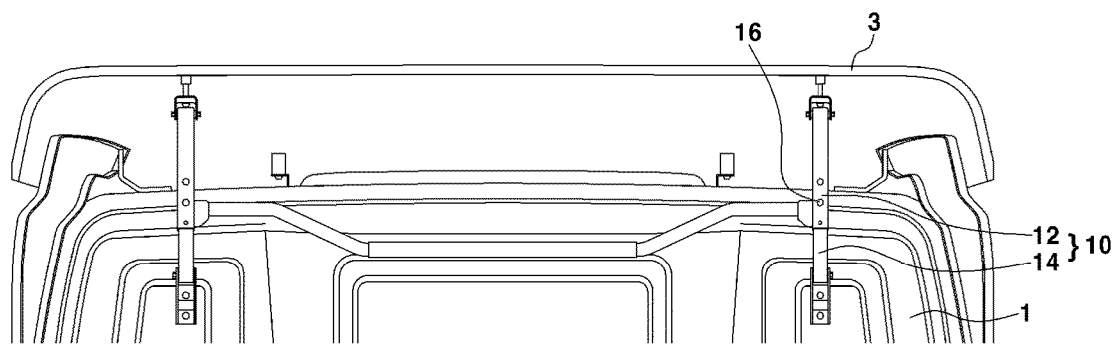
FIG. 2 (RELATED ART) is a partial perspective view illustrating a height adjustment device for a conventional roof spoiler.

FIG. 1 (RELATED ART) is a view of a roof spoiler which is mounted on a conventional freight vehicle, and FIG. 2 (RELATED ART) is a view of a height adjustment device for a conventional roof spoiler.

Referring to FIGS. 1 and 2, the freight vehicle includes a roof spoiler 3 installed at a roof panel 2 of a vehicle body 1 which has a cab in which occupant(s) such as a driver and passenger(s) ride, and a height adjustment stay 10 which is provided between the backside of the vehicle body 1 and the roof spoiler 3 so as to adjust the height of the roof spoiler 3.

The height adjustment stay 10 is formed of an upper stay 12, and a lower stay 14 inserted in an inner portion of the upper stay 12. The height of the roof spoiler is adjusted in such a way to adjust the length that the lower stay 14 is inserted in an inner portion of the upper stay 12 and then fixedly engaged using a bolt 16.

In a case of the height adjustment stay 10, whenever a height adjustment of the roof spoiler 3 is needed, the bolt 16 and the nut are loosened, and the length of the height adjustment stay 10 is adjusted by controlling an overlapping space between the upper stay 12 and the lower stay 14, and they are fixedly engaged again using the bolt 16 and the nut, which may require complicated procedures.

Moreover, since the height adjustment stay 10 is disposed at the left and right sides of the roof spoiler 3, while one person is holding the roof spoiler 3 so as not to descend, another person should adjust the length of the height adjustment stay 10 after the bolt 16 and the nut are loosened. In other words, at least two people (workers) are simultaneously required to adjust the length of the roof spoiler 3.

Further, the height adjustment amount of the roof spoiler 3 must be sufficient to respond to different heights of the container boxes 4 loaded on the freight vehicle. Since the height adjustment amount of the roof spoiler is set in a limited manner in consideration of any interference between the roof spoiler 3 and the roof panel 2 of the vehicle body 1 and the structure of the height adjustment stay 10, the height adjustment of the roof spoiler 3 is limited. For this reason, it is impossible to effectively reduce the height difference between the roof panel 2 of the vehicle body 1 and the container box 4 so as to accommodate all height differences.

The present invention provides a height adjustment device for a roof spoiler by which the height of the roof spoiler can be adjusted through an easier operation, and the aerodynamic performance can be enhanced by increasing the height adjustment amount of the roof spoiler.

The embodiments of the present invention will be described in detail with reference to the accompanying drawings.

Figure 3:
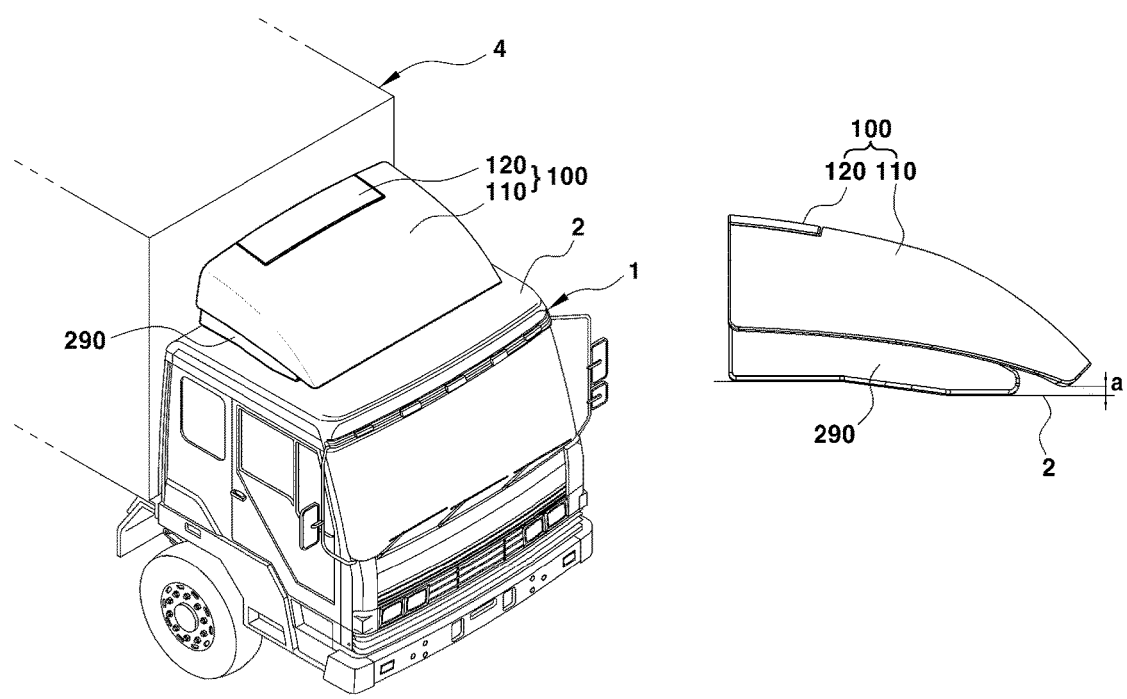
FIG. 3 is a perspective view and a side view of a roof spoiler according to an embodiment of the present invention.
Figure 4:
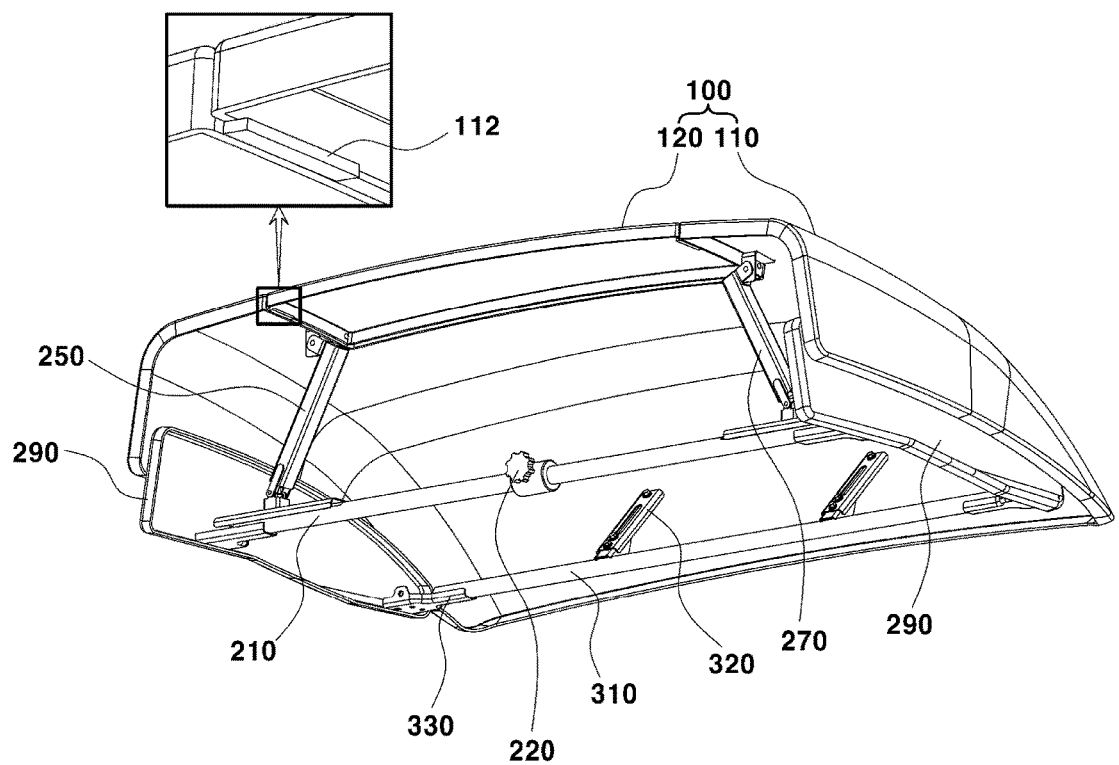
FIGS. 4 and 5 are perspective views of a height adjustment device for a roof spoiler according to an embodiment of the present invention.
Figure 5:
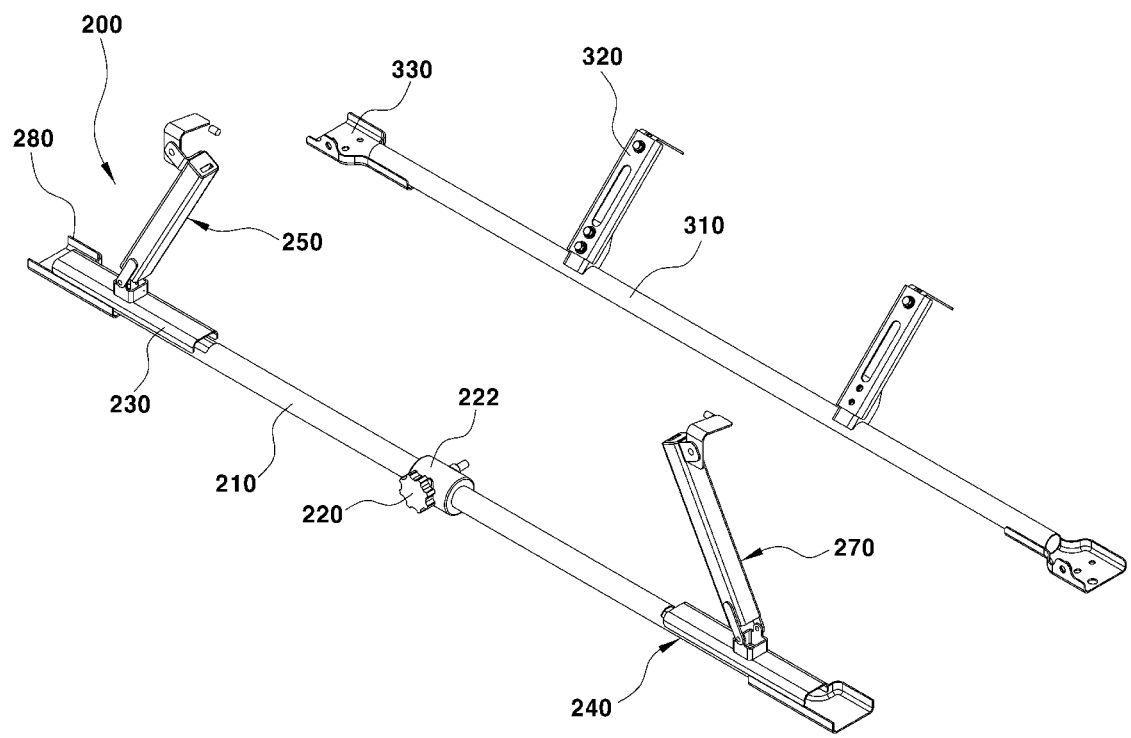
Figure 6:
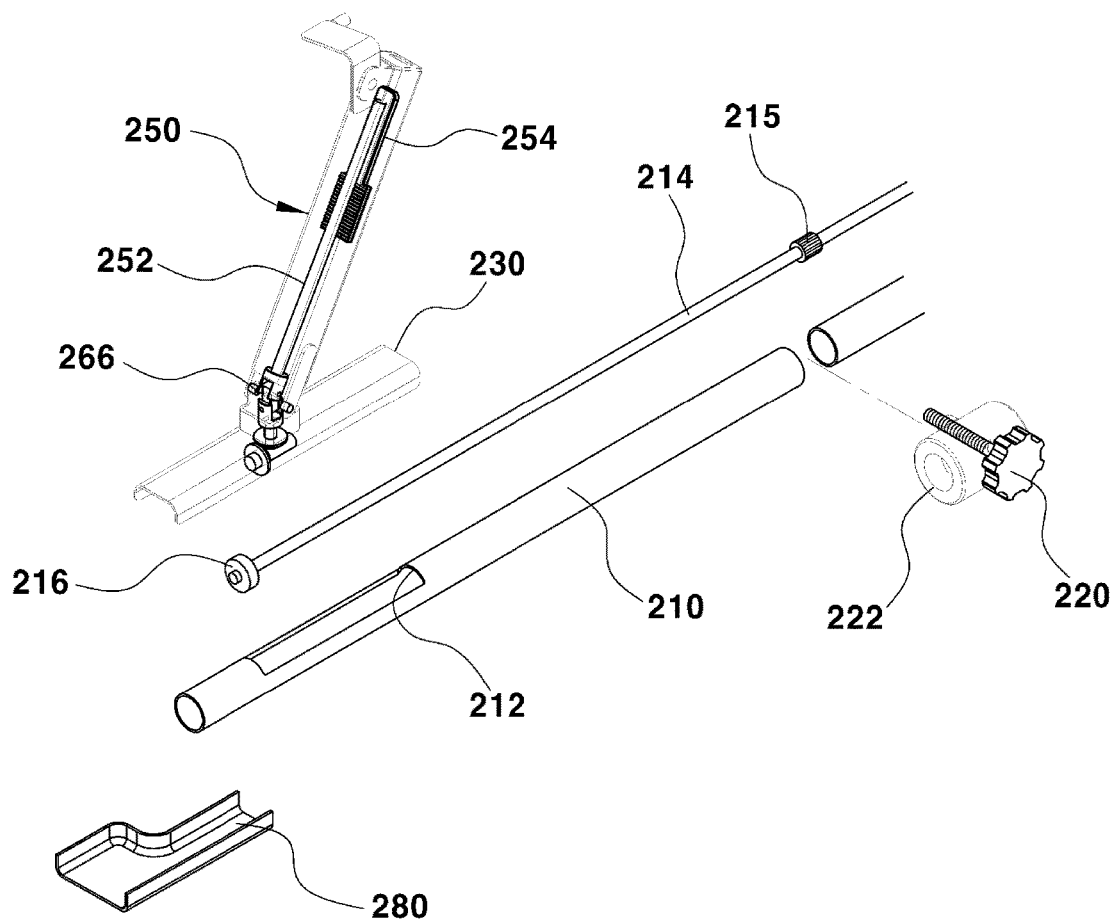
FIG. 6 is a perspective view of one side of a height adjustment unit in which left and right sides of the height adjustment device for the roof spoiler are formed symmetric to each other according to an embodiment of the present invention.

FIG. 3 is a view of a roof spoiler according to an embodiment of the present invention, FIG. 4 and FIG. 5 are views of a height adjustment device for a roof spoiler according to an embodiment of the present invention, and FIG. 6 is a view of one side of a height adjustment unit in which left and right sides of the height adjustment device for the roof spoiler are formed symmetric to each other according to an embodiment of the present invention.

Figure 7:
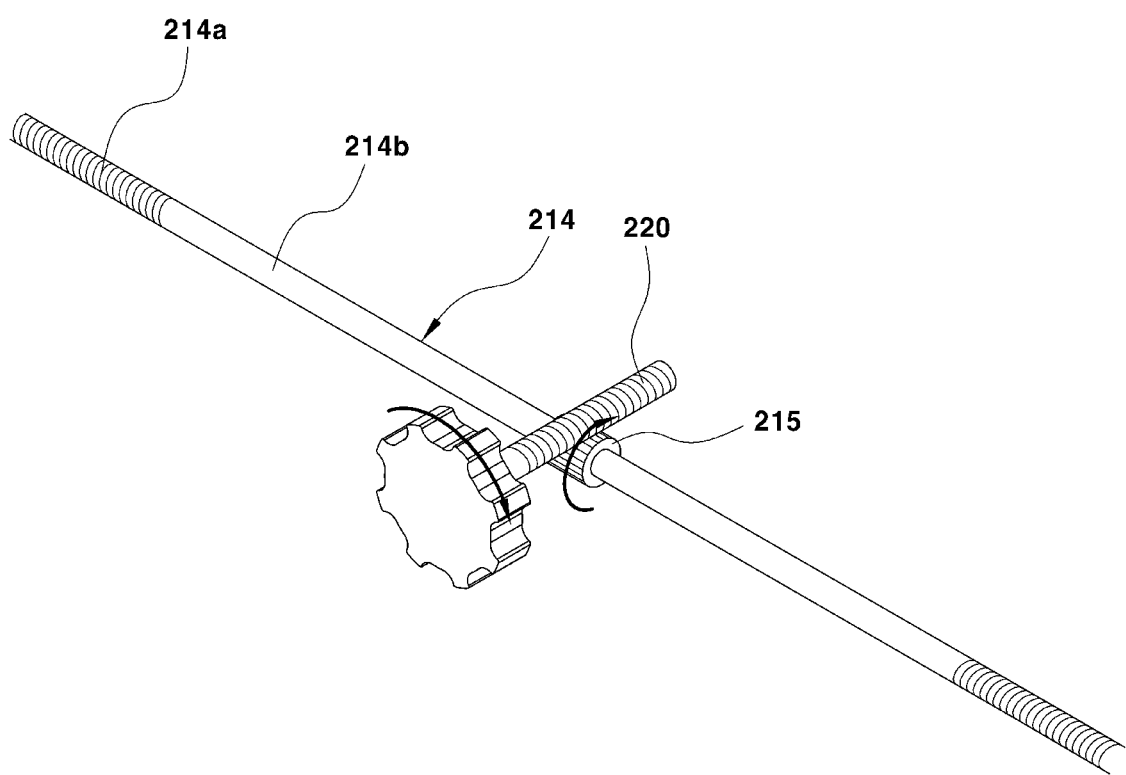
FIGS. 7 to 9 are perspective views illustrating a partially enlarged major portion of a height adjustment device for a roof spoiler according to an embodiment of the present invention.
Figure 8:
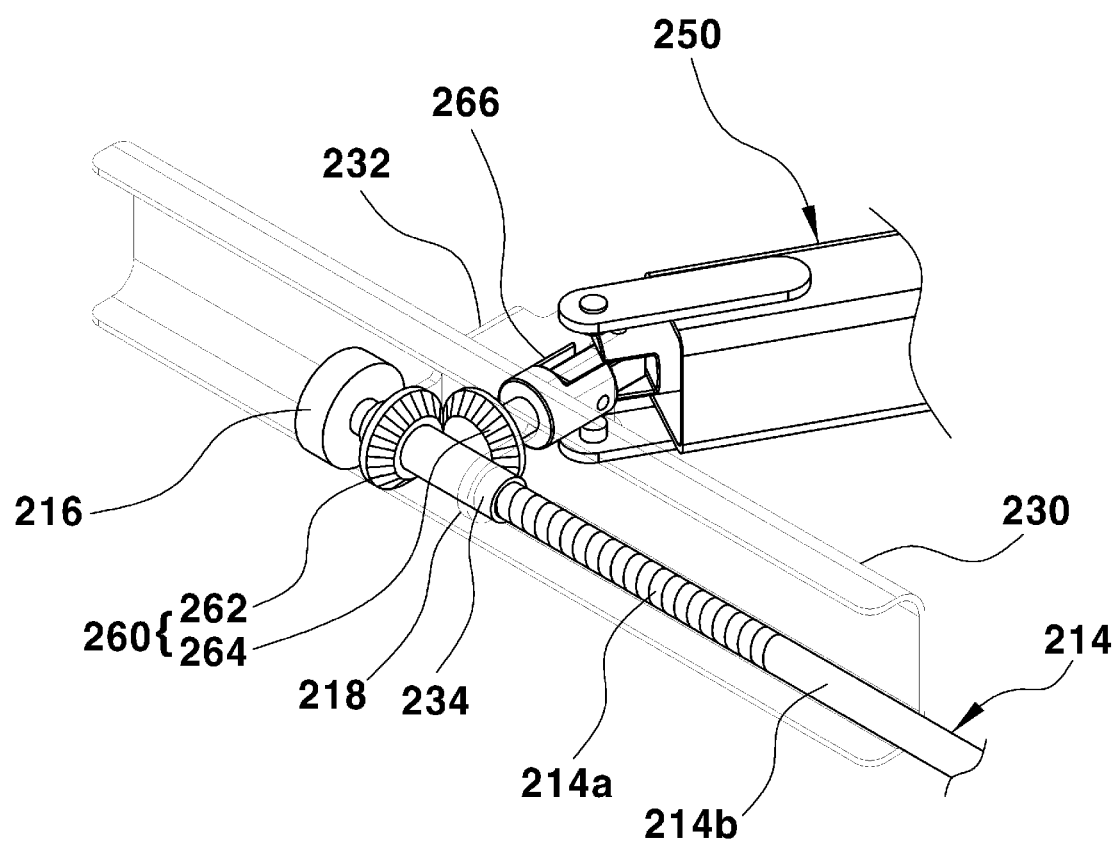
Figure 9:
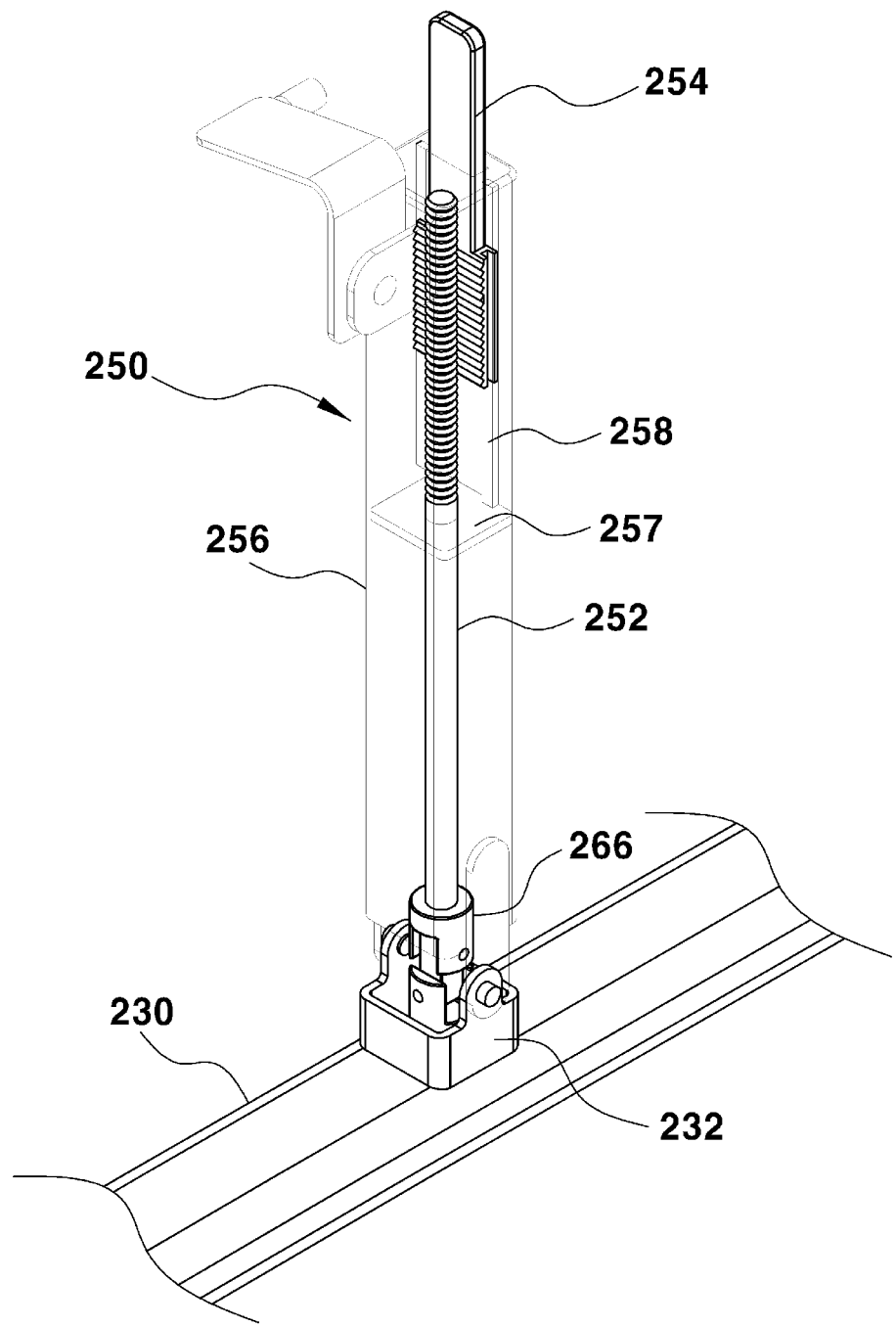

Moreover, FIGS. 7-9 are views of a partially enlarged major portion of a height adjustment device for a roof spoiler according to an embodiment of the present invention.

When describing the symmetrical structure of the height adjustment unit of the height adjustment device for the roof spoiler, one side structure between the left and right side structures will be illustrated and described for easier understanding. The description and reference numbers on the components of the other side structure will be omitted since the symmetrical left and right side structures are configured and operate in the same way.

Referring to FIGS. 3 and 4, the roof spoiler 100 installed at the roof panel 2 of the vehicle body 1 may include, but is not limited to, a main spoiler 110, and a tilt spoiler 120.

The tilt spoiler 120 is hinged rotatable at a rear end portion of the main spoiler 110, and a lower end portion of the tilt spoiler 120 is supported by a lower end engaging shoulder 112 formed at a rear end portion of the main spoiler 110.

The main spoiler 110 may have a predetermined gap "a" with an upper end of the roof panel 2 at an initial stage before the height is adjusted.

A base panel 290 is fixedly installed at the left and right sides of the roof panel 2, and the roof spoiler 100 is disposed on the roof panel 2 of the vehicle body 1 by the base panels 290 provided at both sides.

A height adjustment unit 200 is installed between the roof spoiler 100 and the base panels 290, which are disposed at both sides, so as to adjust the height of the rear end portion of the roof spoiler 100.

The height adjustment unit 200 is configured to first adjust the height of the rear end portion of the main spoiler 110 and second adjust the height of the rear end portion of the tilt spoiler 120, such that it is possible to additionally improve the aerodynamic performance by raising or lowering, if necessary, the height of the rear end portion of the tilt spoiler 120 after the height of the rear end portion of the main spoiler 110 is adjusted.

Referring to FIGS. 4 and 5, the height adjustment unit 200 is configured to operate in a state where the left and right sides thereof are arranged symmetric about a height adjustment knob 220 disposed in the center. The height adjustment unit 200 may include a pair of sliding stays 230 and 240 formed of a first sliding stay 230 and a second sliding stay 240 which are disposed at the left and right sides of the height adjustment knob 220 (hereinafter, referred to as "knob"), and a pair of height adjustment stays 250 and 270 formed of a first height adjustment stay 250 and a second height adjustment stay 270.

The height adjustment unit 200 may be configured in such a way that the roof spoiler 100 can be height-adjusted with two stages by only rotational operation of the knob 220.

The knob 220 is assembled to be axially rotatable to the central portion of a rod pipe 210 via a piper connector 222, and the rod pipe 210 is fixedly installed between both the base panels 290 by a mounting bracket 280.

The pipe connector 222 is fixedly assembled to the central portion formed in the longitudinal direction of the rod pipe 210 and is able to support rotatably the knob 220 in the axial line direction which is orthogonal to the longitudinal direction of a main rod 214.

Referring to FIGS. 6 and 7, the knob 220 is tooth-engaged to a gear unit 215 which is installed integral with the central portion formed in the longitudinal direction of the main rod 214 and is able to rotate in the axial direction which is orthogonal to the axial line direction of the gear unit 215 when the user operates the rotations thereof.

The thread engagement between the knob 220 and the gear unit 215 may be provided in a worm gear structure.

The main rod 214 is provided to move a pair of the sliding stays 230 and 240 connected to both end portions of the longitudinal direction thereof in the longitudinal direction of the main rod 214. The main rod 214 is able to allow the first sliding stay 230 connected to one side between the left and right sides and the second sliding stay 240 connected to the other side between them to move together toward the central portion in the longitudinal direction of the main rod 214 during the axial rotation in cooperation with the rotational operation of the knob 220 or to return to both side ends.

The sliding stays 230 and 240 may move together toward the central portion of the main rod 214 in response to the rotation direction of the knob 220 or may return to both side ends of the main rod 214. When the sliding stays 230 and 240 move together toward the central portion of the main rod 214, the height of the lower end portion of the main spoiler 110 will increase, and when the sliding stays 230 and 240 move separately toward the side ends of the main rod 214, the height of the lower end portion of the main spoiler 110 will return its initial height.

The heights of the main spoiler 110 and the tilt spoiler 120 refer to the height between the top of the roof panel 2 and the lower end portion of the main spoiler 110 and the height between the top of the roof panel 2 and the lower end portion of the tilt spoiler 120.

The first and second sliding stays 230 and 240 are configured in a symmetrical structure to move in the directions opposite to each other when they move in the longitudinal direction of the main rod 214 in response to the rotation operation of the knob 220.

The main rod 214 may be equipped with a thread part 214*a* formed in a thread shape, where the threads are formed at both ends of the main rod 214, with the directions of the formed threads being opposite to each other, in order for the first and second sliding stays 230 and 240 to move in the directions opposite to each other.

The main rod 214 may be installed to be axially rotatable at an inner portion of the rod pipe 210 via a rod holder 216 which is fixedly installed at an inner portion of the rod pipe 210. A thread part holder 218 is provided at both ends in the longitudinal direction of the main rod 214 so as to linearly move a pair of the sliding stays 230 and 240 in the directions opposite to each other, along the longitudinal direction of the main rod 214, in cooperation with the axial rotation of the main rod 214 (refer to FIG. 8).

As illustrated in FIG. 8, the thread part holder 218 has, on an inner circumferential surface thereof, a spiral configuration corresponding to the thread part 214*a* of the main rod 214, so the thread part holder 218 can be engaged to the thread part holder 218 and at the same time can be engaged with the sliding stay 230 to move together, and accordingly it is able to linearly move the sliding stay 230 while linearly moving in the longitudinal direction of the main rod 214 during the rotation of the main rod 214. At this time, a pair of the sliding stays 230 and 240 which are configured in a symmetrical structure to move separately in the directions opposite to each other may be able to move together toward the central portion of the main rod 214 or move separately toward both ends of the main rod 214, thereby being widened.

The thread part holder 218 may be engaged with the sliding stay 230 to move together by the stay bracket 234. The stay bracket 234 may be provided integral while protruding from the lower surface of the sliding stay 230.

Moreover, a holder cooperation unit 260 may be provided between the thread part holder 218 and the height adjustment stay 250 so as to operate the height adjustment stay 250 in response to the rotational operation of the thread part holder 218.

The holder cooperation unit 260 may be formed of a first helical gear 262, a second helical gear 264, and a joint unit 266.

The first helical gear 262 is fixedly engaged to an outer circumferential surface of the thread part holder 218, and accordingly it can linearly move while rotating integral with the thread part 214*a* during the axial rotation of the main rod 214. The second helical gear 264 is rotatably tooth-engaged with the first helical gear 262 in the axial line direction which is orthogonal to the first helical gear 262.

The joint unit 266 is engaged with to the second helical gear 264 in a coaxially rotatable manner, and at the same time is engaged with the height adjustment rod 252 of the height adjustment stay 250 in a coaxially rotatable manner, and accordingly the height adjustment rod 252 can axially rotate during the rotational operation of the second helical gear 264.

A pair of the height adjustment stays 250 and 270 are formed of a first height adjustment stay 250 and a second height adjustment stay 270, which are arranged symmetrical to each other. Each of the height adjustment stays 250 and 270 may be formed of a height adjustment rod 252, a popup rod 254, and a height adjustment pipe 256 (see FIG. 9).

The height adjustment rod 252 may be connected integral and rotatable in a coaxial structure to the second helical gear 264 via the joint unit 266, wherein a screw-shaped tooth structure is formed on the top of the height adjustment rod 252.

As illustrated in FIG. 9, the popup rod 254 is tooth-engaged to the top of an upper end portion of the height adjustment rod 252 and linearly moves in the longitudinal direction of the height adjustment rod 252 during the rotation of the height adjustment rod 252 and at the lower portion of the popup rod 254, a tooth structure, which is tooth-engaged to the tooth structure at the top of the height adjustment rod 252, is provided.

A thread engagement structure between the height adjustment rod 252 and the popup rod 254 may be provided in a worm gear structure.

Inside the height adjustment pipe 256, the height adjustment rod 252 and the popup rod 254 are disposed operable. A guide rail 258 is formed protruding from an inner wall surface thereof so as to guide the linear movements of the popup rod 254. A support unit 257 may be provided at a central portion of the longitudinal direction so as to rotatably support the height adjustment rod 252.

In the height adjustment pipe 256, both the side ends thereof are engaged rotatable to a lower surface portion of the main spoiler 110 of each roof spoiler 100 and to the sliding stay 230, and the popup rod 254 installed inside the height adjustment pipe 256 is disposed below the tilt spoiler 120 and is assembled to be linearly movable to the height adjustment pipe 256, and accordingly the popup rod 254 can move upward while pushing up the tilt spoiler 120 when it protrudes upward from the height adjustment pipe 256 due to the rotation of the height adjustment rod 252.

A pair of the height adjustment stays 250 and 270 are connected to both side ends of the main rod 214 via the sliding stays 230 and 240 and supports one side of the rear portion of the roof spoiler 100 in a state where the slopes of the height adjustment stays 250 and 270 change based on the linear movement directions and distances of the sliding stays 230 and 240.

Since the lower ends of the height adjustment stays 250 and 270 rotate the knob 220 in one direction, the height adjustment stays 250 and 270 move toward a central portion of the main rod 214 together with the sliding stays 230 and 240. At this time, the popup rod 254 linearly moves inside the height adjustment pipe 256 since the height adjustment rod 252 rotates in cooperation with the operation of the holder cooperation unit 260.

The main rod 214 may include a non-thread part 214*b* formed between the thread parts 214*a* formed at both side ends which are engaged to the thread part holder 218 so as to interrupt the linear movements of the thread part holder 218. A guide hole 212 may be formed at both side ends of the longitudinal direction of the rod pipe 210 so as to guide the linear movements of the first and second sliding stays 230 and 240. The guide hole 212 formed open at both side ends of the rod pipe 210 is covered by the sliding stays 230 and 240, thereby preventing impurities from being introduced.

When the stay bracket 234 is hooked by an end portion of the guide hole 212 at the moment when the linear movement of the thread part holder 218 is interrupted by the non-thread part 214b, the height adjustment stays 250 and 270 stand vertically upright, thereby raising the rear end portion of the main spoiler 110 to the maximum and supporting it.

Figure 10:
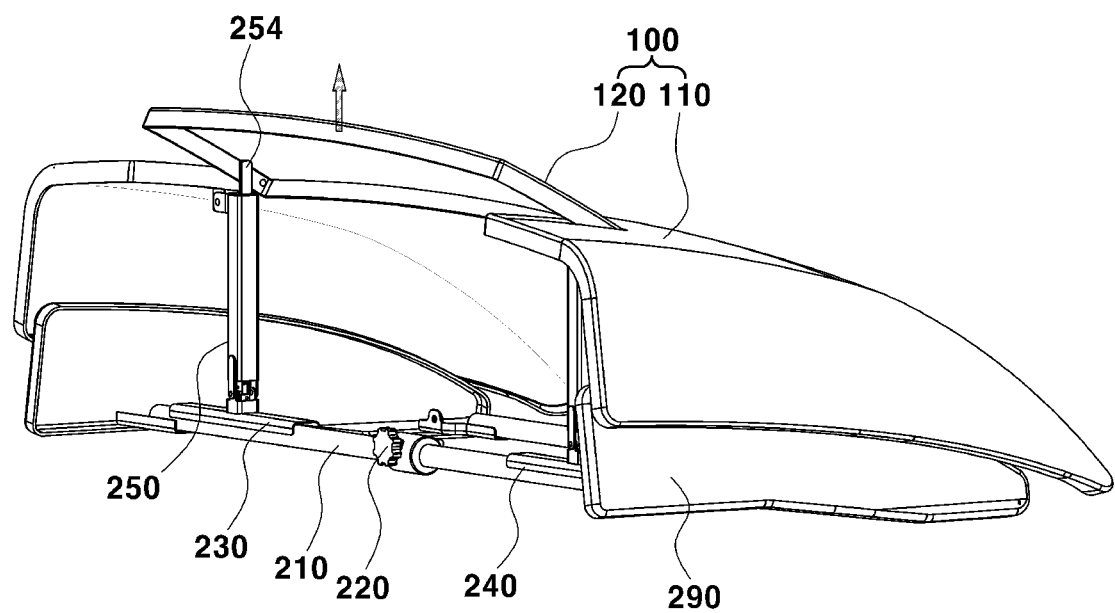
FIG. 10 is a perspective view illustrating a two-stage height-adjusted state of a roof spoiler according to an embodiment of the present invention.

Thereafter, if the user continues to rotate the knob 220 in one direction, the height adjustment rod 252 rotates by the operation of the holder cooperation unit 260, and the popup rod 254 tooth-engaged to the height adjustment rod 252 protrudes upward from the height adjustment pipe 256 and ascends while pushing upward the tilt spoiler 120 and rotating the tilt spoiler 120 about the hinge shaft (refer to FIG. 10).

Meanwhile, in front of the height adjustment unit 200, a hinge reinforcement 310 engaged via the connecting bracket 320 to a front end portion of the roof spoiler 100 is installed to be axially rotatable between the base panels 290 disposed at both sides via the mounting bracket 330. The rear end of the roof spoiler 100 can be supported rotatable about the hinge reinforcement 310.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A height adjustment device for a roof spoiler, comprising:
   a roof spoiler which is disposed at a roof panel of a vehicle body by base panels arranged at both sides; and
   a height adjustment unit configured to adjust the height of a rear end portion of the roof spoiler, wherein the height adjustment unit comprises:
      a height adjustment knob which is assembled to be axially rotatable to a central portion of a rod pipe which is fixedly installed between the base panels of both sides;
      a main rod which operates in cooperation with a rotational operation of the height adjustment knob and is configured to move, in a longitudinal direction, a pair of sliding stays which are connected to both side end portions of the longitudinal direction thereof; and
      a pair of height adjustment stays wherein both the side end portions of each of the height adjustment stays are engaged rotatable to the sliding stays and the roof spoiler, and the height adjustment stays are configured to support one side of the rear end portion of the roof spoiler.

2. The device of claim 1, wherein the main rod is installed to be axially rotatable at an inner portion of the rod pipe by a rod holder, and a thread part holder is assembled to both side end portions of the longitudinal direction of the main rod so as to linearly move a pair of the sliding stays in the directions opposite to each other along the longitudinal direction of the main rod in cooperation with the axial rotation of the main rod.

3. The device of claim 2, wherein the thread part holder is engaged to be linearly movable at the thread part formed at both side end portions of the main rod and is engaged integrally movable to the sliding stays.

4. The device of claim 2, wherein a holder cooperation unit is provided between the thread part holder and the height adjustment stay so as to operate the height adjustment stays in response to a rotational operation of the thread part holder.

5. The device of claim 4, wherein the holder cooperation unit comprises:
   a first helical gear which is engaged to be linearly movable while rotating integral with the thread part holder;
   a second helical gear which is tooth-engagedly rotatable to the first helical gear in the axial line direction which is orthogonal to the axial line direction of the first helical gear; and
   a joint unit which is engaged to be coaxially rotatable to the second helical gear and is connected to be in cooperation with the height adjustment stay.

6. The device of claim 5, wherein the height adjustment stay comprises:
   a height adjustment rod which is connected to be integrally rotatable to the second helical gear via the joint unit; and
   a popup rod which is tooth-engaged to the height adjustment rod and linearly moves in the longitudinal direction of the height adjustment rod during the rotation of the height adjustment rod.

7. The device of claim 5, wherein the height adjustment stay comprises a height adjustment pipe having a guide rail to guide the linear movement of the popup rod, and both the end portions of the height adjustment pipe are engaged rotatable to a lower surface portion of the roof spoiler and to the sliding stay.

8. The device of claim 2, wherein the main rod comprises a non-thread part formed between thread parts of both side end portions engaged to the thread part holder so as to interrupt the linear movement of the thread part holder.

9. The device of claim 1, wherein the roof spoiler comprises:
   a main spoiler; and
   a tilt spoiler which is engaged rotatable to a rear end portion of the main spoiler.

10. The device of claim 9, wherein a lower end portion of the tilt spoiler is supported by a lower end engaging shoulder formed at the rear end portion of the main spoiler.

11. The device of claim 6, wherein the popup rod is disposed below the roof spoiler formed of a main spoiler and a tilt spoiler and ascends while pushing upward the tilt spoiler when protruding upward from a height adjustment pipe.

12. The device of claim 1, wherein the height adjustment knob is assembled to be axially rotatable to a central portion of the rod pipe via a pipe connector, and the main rod includes, at a central portion thereof in the longitudinal direction, a gear unit which is tooth-engaged to the height adjustment knob and is able to rotate in the axial line direction which is orthogonal to the axial line direction of the height adjustment knob.

13. The device of claim 1, wherein a hinge reinforcement, which is engaged to a front end portion of the roof spoiler via a connecting bracket, is installed to be axially rotatable between the base panels of both sides, and a rear end of the roof spoiler is supported rotatable about the hinge reinforcement.

* * * * *